United States Patent [19]
Chang et al.

[11] Patent Number: 5,222,161
[45] Date of Patent: Jun. 22, 1993

[54] METHOD AND APPARATUS FOR COMPRESSING A LIGHT PULSE

[75] Inventors: David B. Chang, Tustin; Victor Vali, Laguna Hills, both of Calif.

[73] Assignee: Hughes Aircraft Company, Los Angeles, Calif.

[21] Appl. No.: 840,223

[22] Filed: Feb. 24, 1992

[51] Int. Cl.$^5$ ............................................. G02B 6/00
[52] U.S. Cl. ......................................... 385/2; 372/12
[58] Field of Search .................... 385/2, 8, 5; 372/12, 372/21, 27

[56] References Cited

U.S. PATENT DOCUMENTS

| | | | |
|---|---|---|---|
| 4,127,320 | 11/1978 | Li | 385/2 X |
| 4,368,543 | 1/1983 | Hasegawa | 385/2 X |
| 4,910,738 | 3/1990 | Fujita et al. | 372/27 X |

OTHER PUBLICATIONS

C. L. Tang, "Ultrashort Optical Pulses," Encyclopedia of Physics, Ed. R. G. Lerner & G. L. Trigg, N.Y.; VCH Publishers, Inc. (1991).

Primary Examiner—Akm E. Ullah
Attorney, Agent, or Firm—Elizabeth E. Leitereg; Terje Gudmestad; W. K. Denson-Low

[57] ABSTRACT

This invention discloses a method and apparatus for shortening the length of a pulse of light. Generally, the method entails altering the index of refraction of an optical medium (14) through which the pulse of light is traveling at an area of the medium (14) where the front end of the pulse of light is located, such that the front end of the pulse of light travels slower than the back end, thus enabling the back end to catch up with the front end in order to shorten the length of the pulse. To accomplish this, it is proposed to generate an electric field across the optical medium (14) by a charge carrying medium (12) positioned relative to the optical medium (14), such that the index of refraction is altered by the electro-optic effect. In addition, it is possible to alter the index of refraction of the optical medium (14) by surrounding the optical medium (14) with a piezoelectric material (20) and applying an electric field to the piezoelectric material (20) such that the piezoelectric material (20) compresses the optical medium (14), thus altering the index of refraction.

20 Claims, 1 Drawing Sheet

METHOD AND APPARATUS FOR COMPRESSING A LIGHT PULSE

BACKGROUND OF THE INVENTION

1. Field of the Invention

This invention relates generally to a method for shortening the length of a pulse of light, and more particularly, to a method for shortening the length of a pulse of light by selectively altering the index of refraction of an optical waveguide through which the light pulse travels.

2. Discussion of the Related Art

Different applications are known in which the generation of a pulse of light is desirable and/or required. In some of these applications, such as measurement of chemical reactions and determination of distances, it is important that the pulses of light be very short. By utilizing a very short pulse of light it is possible to view minute objects, such as molecules, before the object has had time to move. Thus, time resolution is effected by the length of the pulse. Additional applications include the ability to transfer information more effectively due to the fact that a shorter light pulse carrying information will require less space. Furthermore, by compressing a light pulse it is possible to vastly increase the pulses intensity beyond the intensity of the original pulse, and therefore, an advantage lies in the reduction in power necessary to generate the original light pulse.

In order to develop a light pulse of a length which is desirable, it generally is necessary to compress the length of the pulse after it has been generated. Different methods are known in the art for reducing the length of a pulse of light. One of those methods is generally referred to as saturable absorption in which an appropriate nonlinear absorption material is positioned in an optical path, generally within a laser cavity, such that the higher intensity portion of a light pulse spike generated by the lasing process is able to pass through the absorption material while the weaker side portions of the light pulse spike are absorbed. Consequently, only the high intensity portion, or the center portion, of the pulse of light is able to traverse the absorber, thus shortening the light pulse. This procedure, however, reduces the overall energy of the pulse of light.

A second method of reducing the length of a pulse of light involves sending the light pulse through a medium which has a varying index of refraction depending on the intensity of the pulse to develop a time-varying frequency chirp on the pulse of light. This time varying pulse can then be sent through a dispersive medium to enable the back end of the pulse to catch up with the front end. Both of the above discussed methods are better described in C. L. Tang, "Ultrashort Optical Pulses," Encyclopedia of Physics, Ed. R. G. Lerner & G. L. Trigg, NY; VCH Publishers, Inc. (1991).

The prior art light pulse shortening methods suffer the drawback of being complex and/or relatively ineffective to produce the desired results. Further, there is still a need for shortening a light pulse beyond the ability of the methods known in the art. What is needed then is a simple and effective method of shortening the length of a pulse of light. It is therefore an object of the present invention to provide such a method.

SUMMARY OF THE INVENTION

The present invention discloses a method for shortening the length of a pulse of light traveling in an optical waveguide by rapidly altering the index of refraction of the material of the waveguide such that the back end of the light pulse catches up with the front end of the light pulse as the pulse travels through the waveguide. More particularly, as a pulse of light is traveling down an optical medium, the index of refraction of the medium is altered such that the index of refraction of the medium surrounding the front end of the light pulse is higher than the index of refraction of the medium surrounding the back end of the light pulse. This makes the front end of the pulse travel slower than the back end, thus enabling the back end to catch up with the front end.

In one preferred embodiment, the pulse of light is confined in an optical waveguide, such as a fiber-optic cable, and the waveguide is surrounded by a charge carrying medium. An appropriate voltage potential is applied to the conductor such that an electric field is generated across the waveguide substantially transverse to the direction of the propagation of the light pulse in the area of the waveguide surrounding the front of the pulse. The electro-optic effect created by the electric field effects the polarizability of the waveguide, and thus, alters the index of refraction at the front of the light pulse.

In another preferred embodiment, the waveguide is enclosed by a piezoelectric material and then surrounded by a charge carrying medium. By applying an appropriate potential to the medium, the piezoelectric material will compress the waveguide such that the index of refraction of the material will be altered. Consequently, by compressing the area of the waveguide at the front end of the pulse in order to provide a higher index of refraction in that area, the back end of the light pulse will catch up with the front end.

Additional objects, advantages, and features of the present invention will become apparent from the following description and appended claims, taken in conjunction with the accompanying drawings.

DETAILED DESCRIPTION OF THE PREFERRED EMBODIMENT

The following discussion of the preferred embodiments concerning shortening the length of a light pulse is merely exemplary in nature and is in no way intended to limit the invention or its application or uses.

As mentioned, this invention deals with the shortening of an optical light pulse traveling in an optical waveguide by altering the index of refraction of the waveguide medium by an electric field. A general discussion of the theoretical aspects of this process is given below in order to provide a better understanding of the invention.

In an electrical traveling wave tube, i.e., a conductive tube generating an electric field within the tube, the electric field can be changed very rapidly with respect to time. Practical changes can be achieved as high as $dE/dt > 10^9 V/cm$ sec., where V is volts. If an electro-optic waveguide is positioned within such an electrical traveling wave tube, it is possible to alter the index of refraction of the waveguide by the electrical field at a rate of $d\eta/dt \simeq 10^9/\text{sec}$. This time is adequate to obtain considerable light pulse shortening.

In order to produce shortening of a light pulse in a practical environment, it is necessary to estimate the shortening of the light pulse to be expected. To do this, we first consider an optical waveguide whose index of refraction $\eta$ is changing with time t linearly, i.e., $$\eta(t) = \eta_0 + \dot{\eta}t.$$

Then, denoting distance down the waveguide as x, and assuming the length of the waveguide is L, we have:

$$dx/dt = c/(\eta_0 + \dot{\eta}t)$$

If the leading edge of a light pulse starts down the waveguide at time $t=0$, and the trailing edge starts down the waveguide at time $t_0$, then the ratio of the final pulse length at ($x=L$) to the original pulse length at ($x=0$) is:

$$R = \frac{\text{Final pulse length}}{\text{Original pulse length}} = \exp(\dot{\eta}L/c).$$

For example, if $\dot{\eta} = 10^9/\text{sec.}$, $c = 3 \times 10^{10}\text{cm/sec}$, and $L = 30\text{cm}$, then $R = e^{-1}$. For longer optical path lengths, R will be smaller. For example, with the above parameters, but instead $L = 300\text{cm}$, $R = e^{-10}$.

If the index of refraction $\eta$ were changed uniformly over the waveguide, as is assumed for the above calculations, the resulting total change $\eta T(t_0)$ would be very large, where $T(t_0)$ is the time it takes the trailing edge of the light pulse to traverse the distance L. This can be seen as:

$$T(t_0) = -\eta_0/\dot{\eta} + (t_0 + \eta/\dot{\eta})\exp(\dot{\eta}L/c)$$

and then, $$\Delta n = \dot{n}(T(t_o) + t_o) = -n_o + \dot{n}t_o + (t_o + n/\dot{n})\exp(\dot{n}L/c)$$
$$= 0(-n_o), \text{ for small } R.$$

To avoid this, it is important to have $\dot{\eta} \neq 0$ only where the pulse is, and not over the whole waveguide simultaneously. In this way the total voltage change (which creates the change in $\eta$) required for each segment is not exorbitant.

Figure 1:
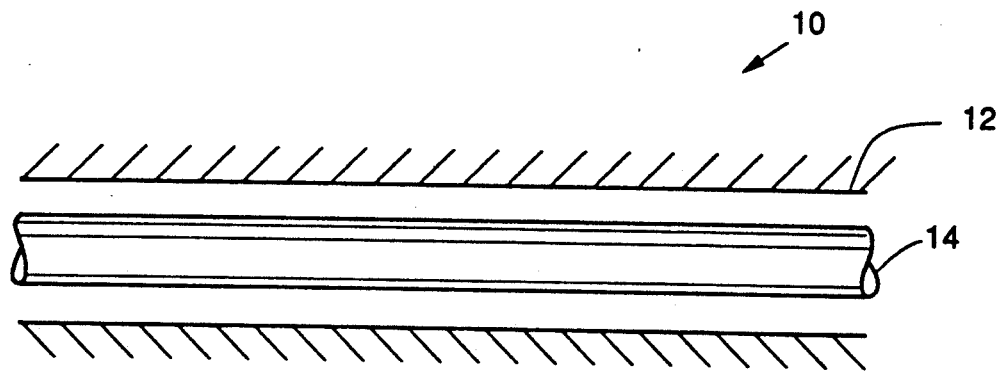
FIG. 1 is an optical waveguide according to one preferred embodiment of the present invention.

Now, a description of this pulse length shortening process will be given with reference to the drawings. Turning to FIG. 1, a traveling waveguide tube 10 is shown. The traveling waveguide 10 includes a charge carrying medium 12 and an optical medium 14 acting as a waveguide, such as a fiber-optic cable. The optical medium 14 can have a graded index of refraction where the index of refraction is greater at the center of the optical medium 14 than it is at its outer surface such that light is confined within the medium 14, as is known in the art. The optical medium 14, further, can be any appropriate crystalline material, such as lithium niobate, which is effected by an electric field in order to alter the polarizability of the optical medium 14.

The charge carrying medium 12 can be any appropriate conducting material or dielectric material which will accept a voltage potential to generate an electric field substantially transverse to the propagation direction of the optical medium 14. The voltage potential is placed on the charge carrying medium 12 by an appropriate charge generating device (not shown). The charge carrying medium 12 can be an outer layer of a fiber-optic cable, or a pair of appropriately positioned plates on opposite sides of the optical medium 14. In the embodiment as shown in FIG. 1, the charge carrying medium 12 could be either of these examples. Also, the charge carrying medium 12 is shown in a spaced relationship from optical medium 14. Although the configuration is effective in this manner, it is not a requirement in that the charge carrying medium 12 can be in contact with the outer surface of the optical medium 14. It is shown in this configuration merely for the sake of clarity.

In operation, an optical pulse will be introduced at one end of the optical medium 14 by a pulse generating device, such as a laser or light emitting diode (not shown). At the same time, a pulse of electrical charge is generated on the charge carrying medium 12 such that the pulse of charge creates an electric field substantially transverse to the propagation direction of the optical medium 14. The electric field pulse will travel down the optical medium 14 at the same rate as the light pulse. By timing the charge pulse and the light pulse relative to each other, it is possible to develop an electric field across the optical medium 14 which alters the polarizability of the material of the optical medium 14 only in an area proximate the front end of the pulse of light. In this regard, the front end of the light pulse is slowed down such that the back end of the light pulse can catch up with it, thus shortening the length of the light pulse and increasing its intensity. In an alternate example, the electric field is applied continuously to the optical medium 14, and is released in a pulsed fashion as the back end of the light pulse is being emitted into the optical medium 14 such that the back end of the pulse is traveling through a region of low index of refraction, thus achieving the same results as above.

Theoretically, it is possible to reduce the light pulse down to practically zero, as shown by the above derivation. Therefore, by appropriately calculating the distance the light pulse will travel, the intensity of the electric field generated, and the optical refractive qualities of the optical medium, it is possible to shorten a light pulse to the desired dimension. It is noted that the length of the pulse of light may be limited by the destructive effect the intensity of a very short pulse of light and the electric field generated by the light pulse may have on the optical material.

Figure 2:
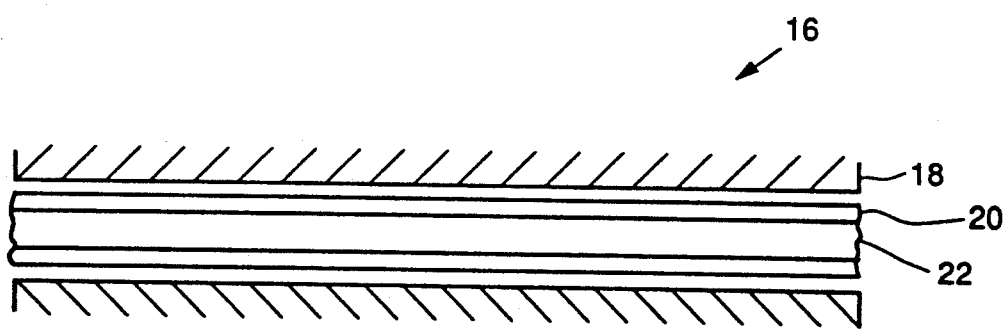
FIG. 2 is an optical waveguide according to another preferred embodiment of the present invention.

Now turning to FIG. 2, a second preferred embodiment is shown in which the optical waveguide medium changes its index of refraction by being compressed. More particularly, a traveling waveguide tube 16 is shown which includes an outer charge carrying medium 18. The charge carrying medium 18 is positioned around a piezoelectric layer 20, which in turn surrounds an optical medium 22, such as a fiberoptic cable. The optical medium 22 can have a graded index of refraction in order to confine the light. As above, the charge carrying medium 18 can be a metal conductor or a dielectric which accepts a voltage potential in order to create an electric field within the piezoelectric layer 20. The piezoelectric layer 20 can be any appropriate piezoelectric material, such as barium titanium oxide ($BaTiO_3$). The optical medium 22 can be any appropriate optical material which is satisfactorily compressible by the piezoelectric layer 20. In a preferred embodiment, the optical material is tellurium dioxide.

In this embodiment, the charge carrying medium 18 creates an electric field in the piezoelectric layer 20 which forces the piezoelectric layer 20 to compress the optical medium 22 such that the optical medium 22 becomes more dense, and thus, its index of refraction increases. The charge carrying medium 18 is shown separated from the piezoelectric layer 20 and the optical medium 22 in a spaced relationship for effect of clarity, but it will be understood that all of the layers could be in contact with each other.

In one example, a pulse of light will be generated by an appropriate device (not shown) and be directed down the optical medium 22. At the same time, a voltage potential is placed on the conductive medium 18, which alters the dimensions of the piezoelectric layer 20, which, in turn, compresses the optical medium 22 such that the index of refraction of the optical medium 22 is higher as the pulse is just being introduced into the optical medium 22. By releasing the voltage potential at the appropriate time before the back end of the pulse is introduced into the optical medium 22, the front end of the light pulse will be traveling through an area of the optical medium 22 which is under compression, and thus, has a higher index of refraction. Further, the back end of the light pulse will be traveling through a portion of the optical medium 22 which is not under compression, and thus, has a lower index of refraction causing the back end to travel faster than the front end. In this manner, the back end will catch up with the front end, thus reducing the length of the light pulse.

In an alternate example, it is possible to be continually applying a potential to the charge carrying medium 18, and then release the potential as the back end of the light pulse is being emitted into the optical medium 22. In this example, only the back end of the light pulse will be traveling through a section of the optical medium 22 which is not under compression whereas the remaining portion of the optical medium 22 is under compression. As above, by calculating the different characteristics, such as field intensity, optical characteristics of the optical medium 22, and the compression factor of the piezoelectric material, it is possible to determine the length of the light pulse at the output end of the optical medium 22.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method of shortening the length of a pulse of optical radiation, said method comprising the steps of:
   directing the pulse of optical radiation through an optical medium; and
   altering the index of refraction of the optical medium between a portion of the optical medium which a front end of the pulse of optical radiation travels through and a portion of the optical medium which a back end of the pulse of optical radiation travels through such that the index of refraction of the portion of the optical medium in which the front end of the pulse travels through is greater than the index of refraction of the portion of the optical medium in which the back end of the pulse travels through so as to enable the back end of the pulse of optical radiation to travel faster than the front end.

2. The method according to claim 1 wherein the step of altering the index of refraction of the optical medium includes the step of applying a voltage potential to a charge carrying medium positioned relative to the optical medium in order to generate an electric field substantially transverse to the direction of the propagation of the pulse of optical radiation.

3. The method according to claim 2 wherein the step of applying a voltage potential includes the steps of generating the voltage potential on the charge carrying medium at approximately the same time as the front end of the pulse of optical radiation is being emitted into the optical medium and releasing the voltage potential before the back end of the pulse of optical radiation is emitted into the optical medium such that the electric field follows the front end of the pulse of optical radiation down the optical medium.

4. The method according to claim 2 wherein the step of applying a voltage potential includes the steps of generating the voltage potential on the charge carrying medium in a continuous fashion and releasing the voltage potential in a pulsed fashion at a time when the back end of the pulse of optical radiation is being emitted into the optical medium.

5. The method according to claim 1 wherein the step of altering the index of refraction of the optical medium includes the steps of positioning a charge carrying medium relative to the optical medium, positioning a piezoelectric material between the charge carrying medium and the optical medium, and applying a voltage potential to the charge carrying medium, wherein an electric field generated by the voltage potential alters the physical dimensions of the piezoelectric material which compresses the optical medium and which alters the index of refraction of the optical medium.

6. The method according to claim 5 wherein the step of applying a voltage potential includes the steps of generating the voltage potential on the charge carrying medium at approximately the same time as the front end of the pulse of optical radiation is emitted into the optical medium and releasing the voltage potential before the back end of the pulse of optical radiation is emitted into the optical medium such that the electric field follows the front end of the pulse of optical radiation down the optical medium.

7. The method according to claim 5 wherein the step of applying a voltage potential includes the steps of generating the voltage potential on the charge carrying medium in a continuous fashion and releasing the voltage potential in a pulsed fashion at a time when the back end of the pulse of optical radiation is being emitted into the optical medium.

8. The method according to claim 2 wherein the optical medium is a fiber-optic cable and the charge carrying medium is an outer layer of the fiber-optic cable.

9. The method according to claim 5 wherein the step of positioning the charge carrying medium and the piezoelectric material between the optical medium and the charge carrying medium includes forming an optical cable.

10. The method according to claim 5 wherein the piezoelectric material is barium titanium oxide.

11. The method according to claim 1 wherein the optical medium is a tellurium dioxide waveguide.

12. An apparatus for shortening the length of a pulse of optical radiation, said apparatus comprising:
   an optical medium operable to direct the pulse of optical radiation; and a charge carrying means for generating an electric field, said charge carrying means being operable to accept a voltage potential to create the electric field, wherein the electric field is operable to cause the index of refraction of the optical medium to change between a region where the front end of the pulse of optical radiation is located and a region where the back end of the pulse of optical radiation is located such that the back end of the pulse catches up with the front end of the pulse in order to shorten the length of the pulse.

13. The apparatus according to claim 12 wherein the charge carrying means creates the electric field in a pulsed fashion such that the electric field follows the front end of the pulse of optical radiation through the optical medium.

14. The apparatus according to claim 12 wherein the charge carrying means creates the electric field in a continuous fashion and releases the electric field in a pulsed fashion when the back end of the pulse of optical radiation enters the optical medium.

15. The apparatus according to claim 12 further comprising a piezoelectric material, said piezoelectric material being positioned such that the electric field causes the dimensions of the piezoelectric material to change which compresses the optical medium to alter the index of refraction of the optical medium.

16. The apparatus according to claim 15 wherein the charge carrying means creates the electric field in a pulsed fashion such that the electric field follows the front end of the pulse of optical radiation through the optical medium.

17. The apparatus according to claim 15 wherein the charge carrying means creates the electric field in a continuous fashion and releases the electric field in a pulsed fashion when the back end of the pulse of optical radiation enters the optical medium.

18. The apparatus according to claim 12 wherein the apparatus is a fiber-optic cable and the charge carrying means is an outer conductor of the fiber-optic cable.

19. The apparatus according to claim 15 wherein the piezoelectric material is barium titanium oxide.

20. The apparatus according to claim 15 wherein the optical medium is a tellurium dioxide optical waveguide.

* * * * *